(12) United States Patent
Mann et al.

(10) Patent No.: US 8,787,407 B2
(45) Date of Patent: Jul. 22, 2014

(54) PROCESSING MESSAGES CORRELATED TO MULTIPLE POTENTIAL ENTITIES

(75) Inventors: Robert A. Mann, Ottawa (CA); Darryl W. Jaakkola, Carp (CA); Laurent Potiez, Ottawa (CA)

(73) Assignee: Alcatel Lucent, Paris (FR)

( * ) Notice: Subject to any disclaimer, the term of this patent is extended or adjusted under 35 U.S.C. 154(b) by 287 days.

(21) Appl. No.: 13/273,853

(22) Filed: Oct. 14, 2011

(65) Prior Publication Data

US 2013/0094520 A1  Apr. 18, 2013

(51) Int. Cl.
 *H04J 1/16* (2006.01)
(52) U.S. Cl.
 USPC ............ 370/475; 370/235; 370/252; 370/352
(58) Field of Classification Search
 USPC ............. 370/475, 252, 235, 253, 465, 395.5, 370/245
 See application file for complete search history.

(56) References Cited

U.S. PATENT DOCUMENTS

| 7,227,872 B1 * | 6/2007 | Biswas et al. ................. 370/465 |
| 8,180,892 B2 * | 5/2012 | Deridder et al. ............. 709/224 |
| 8,521,858 B2 * | 8/2013 | Shaikh et al. ................. 709/223 |
| 2002/0085565 A1 * | 7/2002 | Ku et al. .................. 370/395.42 |
| 2007/0165641 A1 * | 7/2007 | Fitchett et al. ................ 370/392 |
| 2008/0101234 A1 * | 5/2008 | Nakil et al. .................... 370/235 |
| 2010/0229237 A1 * | 9/2010 | Rusche et al. .................. 726/22 |
| 2011/0202660 A1 | 8/2011 | Pandya et al. |
| 2011/0225113 A1 | 9/2011 | Mann |
| 2012/0033581 A1 * | 2/2012 | Torres Ramon et al. ...... 370/253 |

OTHER PUBLICATIONS

International Search report for PCT/CA2012/050696 dated Jan. 18, 2013.

* cited by examiner

*Primary Examiner* — Dang Ton
*Assistant Examiner* — Sai Aung
(74) *Attorney, Agent, or Firm* — Kramer Amado P.C.

(57) ABSTRACT

Various exemplary embodiments relate to a method and related network node including one or more of the following: receiving a message; determining whether the network device should identify an entity associated with the message using a plurality of entity records, wherein each entity record of the plurality of entity records corresponds to an entity; if the network device should identify an entity associated with the message using the plurality of entity records: extracting at least one identification value; identifying a set of entity records as matching the at least one identification value; determining whether the set of entity records includes more than one entity record; and if the set of entity records includes more than one entity record: identifying a most current entity record that has been most recently modified, and processing the message as being associated with the entity to which the most current entity record corresponds.

20 Claims, 4 Drawing Sheets

| | 410 | 420 | 430 | 440 |
|---|---|---|---|---|
| | IP Address | APN | Subscription IDs | Timestamp |
| 450 | 15.58.114.203 | 0x4 | a,b | 1318959897 |
| 460 | 24.214.109.12 | 0x8 | c,d,e | 1324367824 |
| 470 | 15.58.114.203 | 0x1 | f | 1321631745 |
| 480 | 15.58.114.203 | 0x4 | g,h | 1321107671 |
| 490 | ... | ... | ... | ... |

PROCESSING MESSAGES CORRELATED TO MULTIPLE POTENTIAL ENTITIES

CROSS-REFERENCE TO RELATED APPLICATIONS

This application cross-references the following co-pending application, incorporated by reference herein, in its entirety: application Ser. No. 13/273,686, "Processing Messages with Incomplete Primary Identification Information" to Mann et al.

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for processing a message, the method including one or more of the following: receiving a message at the network device; determining whether the network device should identify an entity associated with the message using a plurality of entity records, wherein each entity record of the plurality of entity records corresponds to an entity; if the network device should identify an entity associated with the message using the plurality of entity records: extracting at least one identification value from the message; identifying a set of entity records of the plurality of records as matching the at least one identification value; determining whether the set of entity records includes more than one entity record; and if the set of entity records includes more than one entity record: identifying a most current entity record of the set of entity records that has been most recently modified, and processing the message as being associated with the entity to which the most current entity record corresponds.

Various exemplary embodiments relate to a network device for processing a message, the network device including one or more of the following: a network interface that receives a message; an entity storage that stores a plurality of entity records, wherein each entity record of the plurality of entity records corresponds to an entity; an incoming message handler configured to determine whether the network device should identify an entity associated with the message using a plurality of entity records; an entity identification module configured to, if the network device should identify an entity associated with the message using the plurality of entity records: extract at least one identification value from the message, identify a set of entity records of the plurality of records as matching the at least one identification value, and determine whether the set of entity records includes more than one entity record; and a multiple record resolver configured to, if the set of entity records includes more than one entity record, identify a most current entity record of the set of entity records that has been most recently modified, and a message processor configured to process the message as being associated with the entity to which the most current entity record corresponds.

Various exemplary embodiments relate to a tangible and non-transitory machine-readable storage medium encoded with instructions for execution by a network device for processing a message, the tangible and non-transitory machine-readable storage medium including one or more of the following: instructions for receiving a message at the network device; instructions for determining whether the network device should identify an entity associated with the message using a plurality of entity records, wherein each entity record of the plurality of entity records corresponds to an entity; instructions for, if the network device should identify an entity associated with the message using the plurality of entity records: extracting at least one identification value from the message; identifying a set of entity records of the plurality of records as matching the at least one identification value; determining whether the set of entity records includes more than one entity record; and if the set of entity records includes more than one entity record: identifying a most current entity record of the set of entity records that has been most recently modified, and processing the message as being associated with the entity to which the most current entity record corresponds.

Various embodiments are described wherein: the at least one identification value includes an IP address; and the entity includes at least one of an IP-CAN session and a subscriber.

Various embodiments are described wherein the step of determining whether the network device should identify an entity associated with the message using the plurality of entity records includes one or more of the following: determining whether the message is related to the establishment of a new entity; and if the message is not related to the establishment of a new entity, determining that the network device should identify an entity associated with the message using the plurality of entity records, the method further including one or more of the following, if the message is related to the establishment of a new entity, creating and storing a new entity record, wherein the entity record indicates when the entity record was created.

Various embodiments are described wherein the step of identifying a most current entity record of the set of entity records that has been most recently modified includes identifying a most current entity record of the set of entity records that has been most recently created.

Various embodiments are described wherein the step of processing the message as being associated with the entity to which the most current entity record corresponds includes: identifying a policy and charging rules node (PCRN) blade associated with the entity; and forwarding the message to the PCRN blade.

Various embodiments are described wherein the step of identifying a most current entity record of the set of entity records that has been most recently modified includes comparing at least two timestamps to each other, the timestamps respectively associated with at least two entity records of the set of entity records.

Various embodiments are described wherein the message does not include an access point name (APN).

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

In processing the various messages specified by the 3GPP, it may oftentimes be useful to identify a subscriber, IP-CAN session, or other entity associated with the message. Such entities may be identified based on information carried by the message such as, for example, subscription identifiers, IP addresses, and/or access point names (APN). In some cases, however, the available identification information may not be sufficient to uniquely identify an entity. For example, the 3GPP does not require various accounting and authorization requests (AARs) to carry an APN or subscriber identifiers, leaving only an IP address to use in identifying IP-CAN session. In various embodiments, however, multiple IP-CAN sessions may be associated with the same IP address. As another example, a node may have records of expired IP-CAN sessions that include the same IP address and APN as current IP-CAN sessions.

In view of the foregoing, it would be desirable to provide a method of identifying an entity associated with a message when multiple entity records map to identifying information carried by the message. In particular, it would be desirable to provide a method capable of identifying from multiple entity records matching identification information a record most likely to correspond to the correct entity associated with a message.

Referring now to the drawings, in which like numerals refer to like components or steps, there are disclosed broad aspects of various exemplary embodiments.

Figure 1:
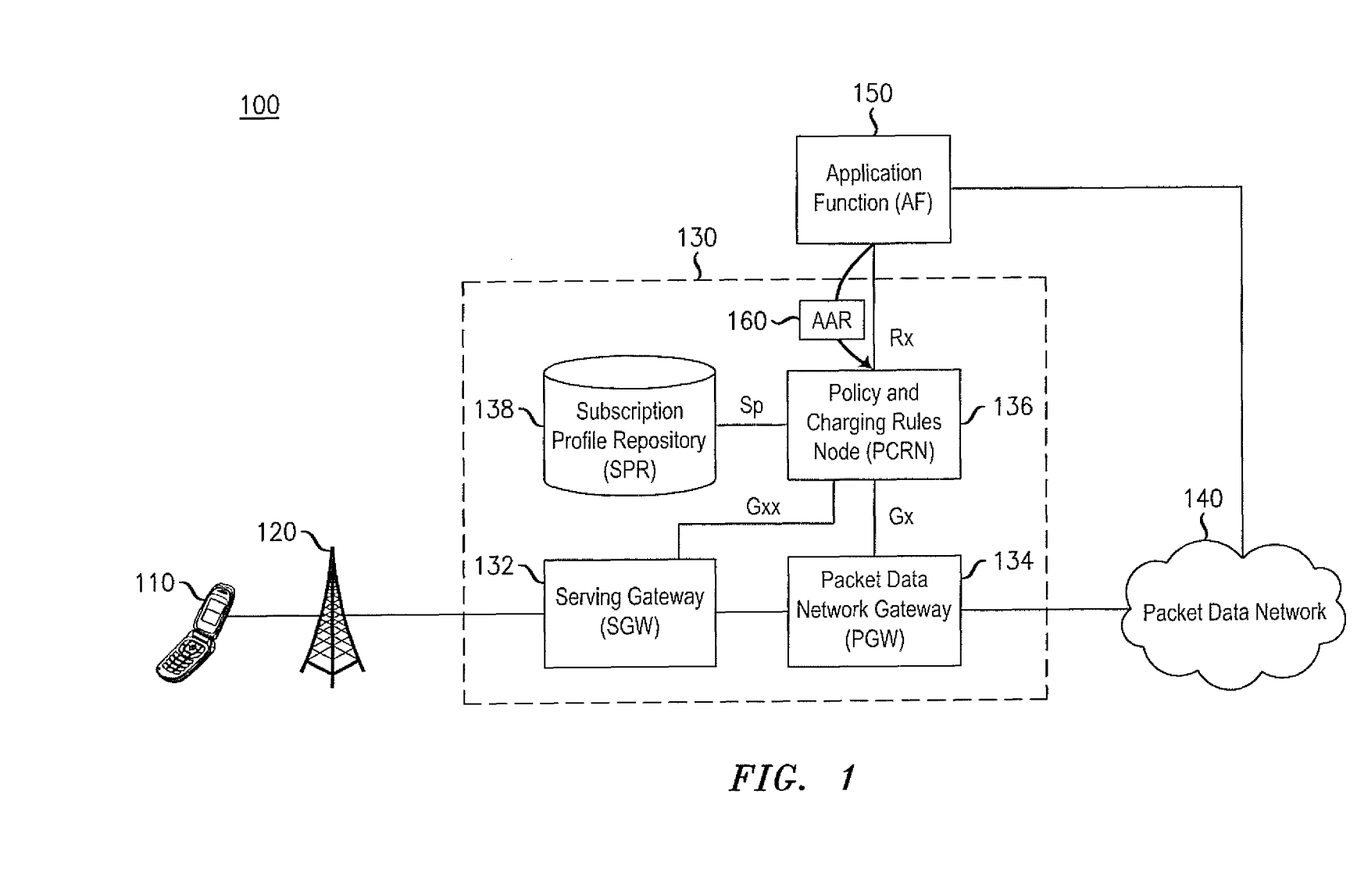
FIG. 1 illustrates an exemplary subscriber network for providing various data services.

FIG. 1 illustrates an exemplary subscriber network 100 for providing various data services. Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an access point name (APN) for an associated IP-CAN session, and/or an identification of the particular service data flows that must be established in order to provide the requested service. AF 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of exemplary subscriber network 100 will be described in further detail below in connection with FIGS. 2-6.

In processing AAR 160, PCRN 136 may attempt to identify an IP-CAN session associated with the request. For example, PCRN 136 may attempt to uniquely identify a known IP-CAN session using an IP address and APN associated with the message. To identify an IP-CAN session, PCRN 136 may refer to a plurality of IP-CAN session records and locate two records that include the IP address and APN. Because there are multiple matching records, PCRN 136 may then determine which of the records was created most recently by, for example, comparing timestamps associated with each of the records. Then, after identifying the most recent record, PCRN 136 may proceed to process the message as being associated with the IP-CAN session corresponding to that most recent record.

Figure 2:
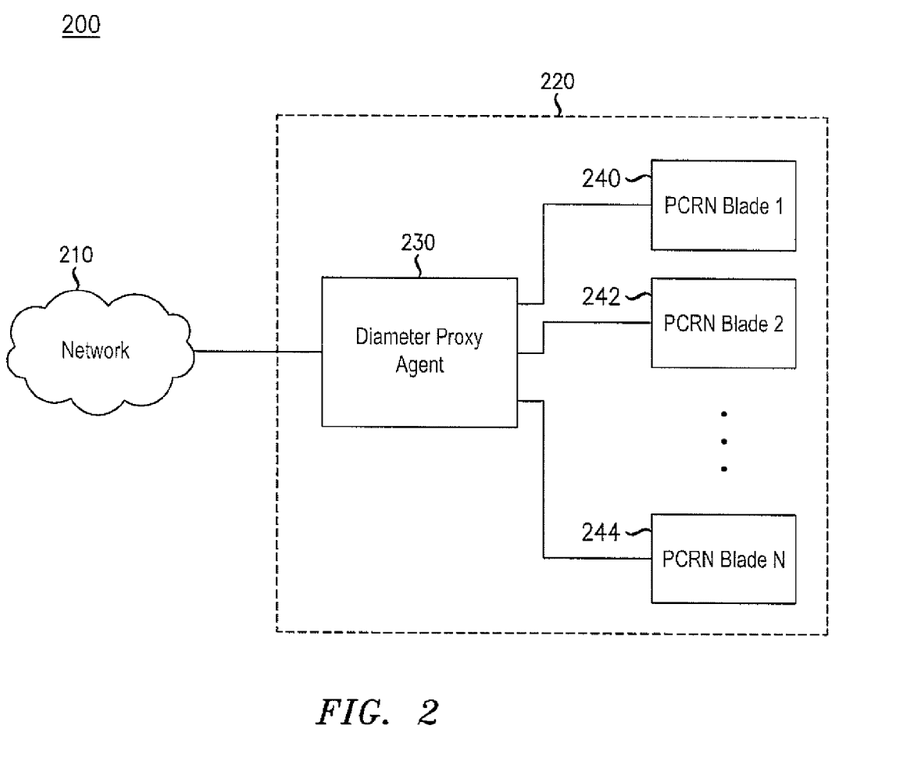
FIG. 2 illustrates an alternative view of the subscriber network of FIG. 1.

FIG. 2 illustrates an alternative view 200 of the subscriber network 100 of FIG. 1. As shown in alternative view 200, exemplary subscriber network 100 may be represented as a network 210 and a policy and charging rules node (PCRN) 220. Network 210 may correspond to one or more devices of exemplary network 100 such as, for example, user equipment 110, PGW 134, and/or AF 150. PCRN 220 may correspond to PCRN 136 of FIG. 1.

To provide scalability and increased processing capacity, PCRN 220 may be organized as a number of separate PCRN blades 240, 242, 244 that communicate with network 210 via a diameter proxy agent (DPA) 230. As such, DPA 230 may act as a message router between network 210 and PCRN blades 240, 242, 244. In various embodiments, DPA 230 may be disposed within the same chassis as PCRN blades 240, 242, 244.

DPA 230 may include a device or group of devices adapted to receive various messages from network 210. For each received message, DPA 230 may identify an appropriate PCRN blade 240, 242, 244 to process the message. For example, in various embodiments, each subscriber may be associated with one PCRN blade 240, 242, 244. In such embodiments, DPA 230 may use information carried by the message to identify a subscriber associated with the message.

DPA 230 may then use a subscriber record, such as a record stored in an SPR, to determine a PCRN blade 240, 242, 244 associated with the subscriber. Finally, DPA 230 may forward a message to that PCRN blade 240. Various alternative methods of PCRN blade assignment and/or forwarding messages to appropriate PCRN blades will be apparent to those of skill in the art. In various embodiments, DPA 230 may also forward messages received from PCRN Blades 240, 242, 244 to appropriate elements of network 210.

PCRN 220 may also include a plurality of PCRN blades 240, 242, 244. It should be noted that, while three PCRN blades 240, 242, 244 are illustrated, various embodiments may include fewer or more PCRN blades. Further, the number of PCRN blades 240, 242, 244 may change during operation of PCRN 220. For example, and administrator may remove PCRN blades that are faulty and/or may add new PCRN blades (not shown) to increase the capacity of PCRN 220.

Each PCRN blade 240, 242, 244 may include a complete implementation of a policy and charging rules function (PCRF) as defined by the 3GPP. Each PCRN blade 240, 242, 244 may be implemented on an independent circuit board and may include various hardware components such as processors, main memory, network and/or backplane interfaces, and/or data storage devices. Accordingly, each PCRN blade 240, 242, 244 may be adapted to perform various PCRF functions such as receiving request messages, processing request messages to create policy and charging control (PCC) rules, installing PCC rules at other nodes.

Figure 3:
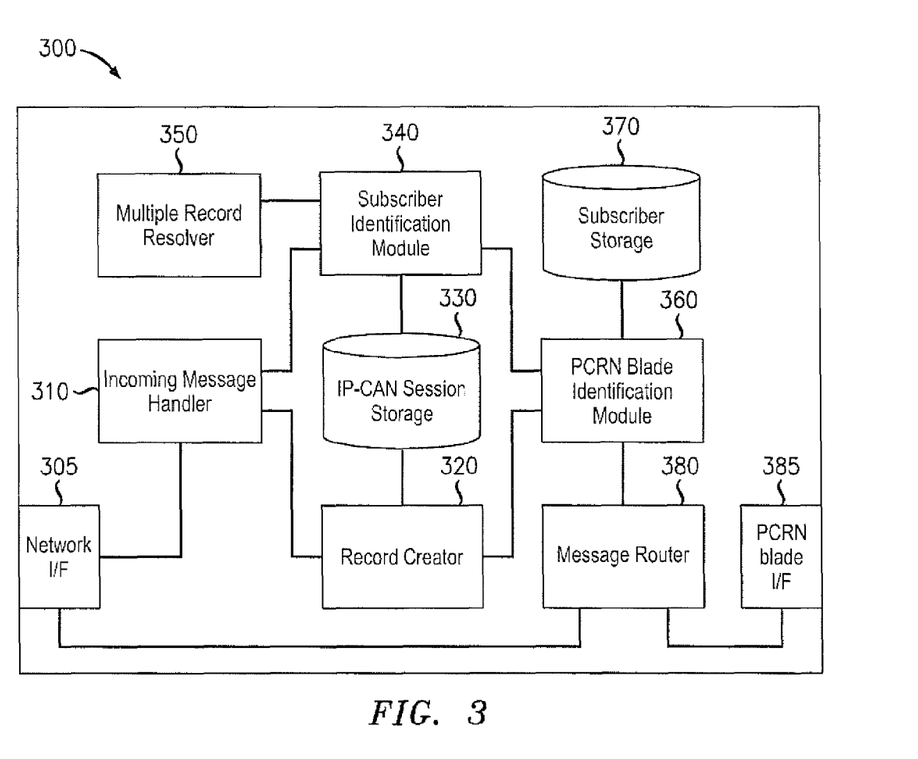
FIG. 3 illustrates an exemplary diameter proxy agent (DPA)

FIG. 3 illustrates an exemplary diameter proxy agent (DPA) 300. Exemplary DPA 300 may correspond to DPA 230 of FIG. 2. DPA 300 may include network interface 305, incoming message handler 310, record creator 320, IP-CAN session storage 330, subscriber identification module 340, multiple entity resolver 350, PCRN blade identification module 360, subscriber storage 370, message router 380, and/or PCRN blade interface 385. It should be noted that exemplary DPA 300 may be, in some respects, a simplification and/or abstraction. As such, various implementations may include additional components (not shown) for providing additional or augmented functionality and various components may be implemented on hardware such as one or more processors, field programmable gate arrays (FPGAs), and/or main memories. Further, various alternative arrangements for achieving the functions detailed herein may be apparent to those of skill in the art.

Network interface 305 may be an interface comprising hardware and/or executable instructions encoded on a machine-readable storage medium configured to communicate with at least one other device such as, for example, a PGW and/or AF. In various embodiments, network interface 305 may be an Ethernet interface. During operation, network interface 305 may receive a request message from another device and forward the message to incoming message handler 310.

Incoming message handler 310 may include hardware and/or executable instructions on a machine-readable storage medium configured to receive incoming messages via network interface 305 and forward the messages to an appropriate module for further processing based on the message type. For example, upon receiving a message, incoming message handler may determine whether the message is request for the establishment of a new IP-CAN session. If the message does relate to a new IP-CAN session, incoming message handler 310 may forward the message to record creator 320 so that DPA 300 may take note of the new IP-CAN session. Otherwise, incoming message handler 310 may forward the message to subscriber identification module 240 such that the message may be processed in accordance with an already-known IP-CAN session. In other words, the incoming message handler 310 evaluates a message to determine whether DPA 300 should identify an associated entity, such as an IP-CAN session, using a plurality of entity records already stored on the DPA 300, as will be described in greater detail below. It should be noted that various additional modules (not shown) may be present to process other types of messages. For example, incoming message handler 310 may be configured to determine whether a received message requests the termination of an IP-CAN session. In such embodiments, incoming message handler 310 may be configured to pass such messages to a module (not shown) responsible for cleaning up IP-CAN session records. Various modifications will be apparent to those of skill in the art.

Record creator 320 may include hardware and/or executable instructions on a machine-readable storage medium configured to create a new IP-CAN session record based on a received message and store the new record in IP-CAN session storage. In various embodiments, record creator 320 may extract one or more identification values useful in identifying an IP-CAN session. Such identification values may include, for example, an IP address and an APN. Record creator may also extract information to be correlated with the IP-CAN session such as, for example, one or more subscription identifiers. In various embodiments, the IP-CAN session establishment message may not carry one or more of these values. For example, record creator may refer to subscriber storage 370 to retrieve one or more subscriber identifiers or may communicate with a PCRN blade or other device to retrieve an IP address. Further modifications will be apparent to those of skill in the art. Upon retrieving these values, record creator 320 may generate a new record and store the record in IP-CAN session storage. In various embodiments, record creator 320 may also include a timestamp corresponding to a current time in the record. After creating the new record, record creator may pass the message and/or at least one subscriber identifier to PCRN blade identification module 360.

IP-CAN session storage 330 may be any machine-readable medium capable of storing information related to various IP-CAN sessions known to the DPA 300. Accordingly, IP-CAN session storage 330 may include a machine-readable storage medium such as read-only memory (ROM), random-access memory (RAM), magnetic disk storage media, optical storage media, flash-memory devices, and/or similar storage media. IP-CAN session storage 330 may store a record for each known IP-CAN session along with one or more subscriber identifiers and/or a time indicator associated therewith. It will be apparent to those of skill in the art that IP-CAN session storage 330 may include various additional information useful in providing additional functions of DPA 300. In various embodiments, IP-CAN session storage 330 may be a device or group of devices that is external to DPA 300. For example, IP-CAN session storage 330 may be implemented among a number of PCRN blades.

Subscriber identification module 340 may include hardware and/or executable instructions on a machine-readable storage medium configured to identify a subscriber associated with a received message. For example, subscriber identification module 340 may utilize an IP address and/or APN carried by the message to look up an IP-CAN session stored in IP-CAN session storage 330 and retrieve one or more subscriber identifiers associated with the IP-CAN session. Alternatively, subscriber identification module 340 may simply extract one or more subscriber identifiers from the received message, if present. Subscriber identification module 340 may then pass the message and/or subscriber identifiers to PCRN blade identification module 360.

In various embodiments, the identification values extracted from a received message may not uniquely identify an IP-CAN session. For example, the message may not include an APN and subscriber identification module 340 may attempt to identify an IP-CAN session based on the IP address alone. Because various APNs may be associated with overlapping address pools, however, the IP address may identify more than one different IP-CAN session. As another example, IP-CAN session storage 330 may include outdated records having identification values that overlap current records. IP-CAN session storage might include outdated records in cases where DPA 300 either did not receive or did not process a termination message associated with an IP-CAN session. In cases where the identification information does not uniquely identify an IP-CAN session record, subscriber identification module may forward the set of matching records to multiple record resolver 350. Subscriber identification module 340 may then receive a single record from multiple record resolver 350, as will be described below, and proceed as previously described.

Multiple record resolver 350 may include hardware and/or executable instructions on a machine-readable storage medium configured to determine, of a plurality of entity records such as IP-CAN session records, which record should be used in processing a received message. In various embodiments, multiple record resolver 350 may determine which record has been most recently modified and pass that record back to the requesting module such as, for example, subscriber identification module 340. As used herein, a record may be "modified" on various occasions. For example, a record may be modified when it is created, whenever data held within the record is updated, and/or whenever the record is used to process a message. Various embodiments may deem the record "modified" only upon creation and, therefore, multiple record resolver 350 may simply identify the entity record that was created most recently or, in other words, "the most current entity record[.]"

To determine a most recently modified or created record, multiple record resolver 350 may refer to an indication of when the record was created or modified. For example, each record may include a timestamp indicating the last time the entity record was modified or when the entity record was created. As such, multiple record resolver 350 may simply return the record having the highest timestamp value. Various alternative indications of when the record was modified or created will be apparent to those of skill in the art. For example, the records may be ordered according to modification or creation time, in which case multiple record resolver 350 may simply return the first record.

PCRN blade identification module 360 may include hardware and/or executable instructions on a machine-readable storage medium configured to identify a PCRN blade associated with a subscriber. For example, using one or more subscription identifiers passed by subscriber identification module 340, PCRN blade identification module 360 may refer to a subscriber storage 370 to retrieve a record associated with the subscriber. Such record may, in turn, identify a PCRN blade to which that subscriber is assigned and, consequently, to which the message should be forwarded. PCRN blade identification module 360 may then forward the message and an indication of the appropriate PCRN blade to message router 380.

Subscriber storage 370 may be any machine-readable medium capable of storing information related to various subscribers. Accordingly, subscriber storage 370 may include a machine-readable storage medium such as read-only memory (ROM), random-access memory (RAM), magnetic disk storage media, optical storage media, flash-memory devices, and/or similar storage media. Subscriber storage 370 may store a record for each subscriber along with a PCRN to which each subscriber is assigned. It will be apparent to those of skill in the art that subscriber storage 370 may include various additional information useful in providing additional functions of DPA 300. In various embodiments, subscriber storage 370 may be a device that is external to DPA 400. For example, subscriber storage 370 may be a subscription profile repository (SPR). In various embodiments, subscriber storage 370 may be implemented by the same physical device as IP-CAN session storage 330.

Message router 380 may include hardware and/or executable instructions on a machine-readable storage medium configured to route messages between PCRN blades and other network devices. For example, message router 380 may receive a message and indication of a PCRN blade from PCRN blade identification module 360. Alternatively, message router 380 may receive an indication of a PCRN blade from PCRN blade identification module 360 but may receive the message itself directly from network interface 305. In turn, message router 380 may transmit the message to the identified PCRN blade via PCRN blade interface 385. Message router 380 may also receive messages such as authentication and authorization answers (AAAs) and reauthorization requests (RARs) via PCRN blade interface 385 and route such messages to the appropriate nodes via network interface 305.

PCRN blade interface 385 may be an interface comprising hardware and/or executable instructions encoded on a machine-readable storage medium configured to communicate with one or more PCRN blades. In various embodiments, PCRN blade interface 385 may include an Ethernet, PCI, SCSI, ATA, and/or other hardware interface technologies. In various embodiments, PCRN blade interface 385 may include a blade server backplane. In various embodiments, PCRN blade interface 385 may be the same physical device as network interface 305.

It will be apparent to those of skill in the art that various alternative embodiments may utilize alternative methods to map an incoming message to an appropriate PCRN blade. For example, DPA 300 may include a direct mapping between IP-CAN session identifiers and PCRN blades. In such embodiments, DPI 300 may use identification values to identify a different entity; for example, instead of identifying a subscriber and an IP-CAN session, DPI 300 may identify only an IP-CAN session using the primary identification information associated with a received message. As yet another alternative, the identification values may map directly to a PCRN blade; as such, the identified entity may include only a PCRN blade. Accordingly, as used herein, the term "entity" will be understood to refer to any entity that may be identified using primary identification information during the normal course of DPI operation. Further, to accommodate the identification of various entities, DPA 300 may include storage for various types of entity records. For example, instead or in addition to storing IP-CAN session records, DPA 300 may store a number of PCRN blade records. It should be apparent that the methods described herein may be useful in selecting among multiple potential entity records of any type. Various modifications to realize such alternative embodiments will be apparent to those of skill in the art.

Figure 4:
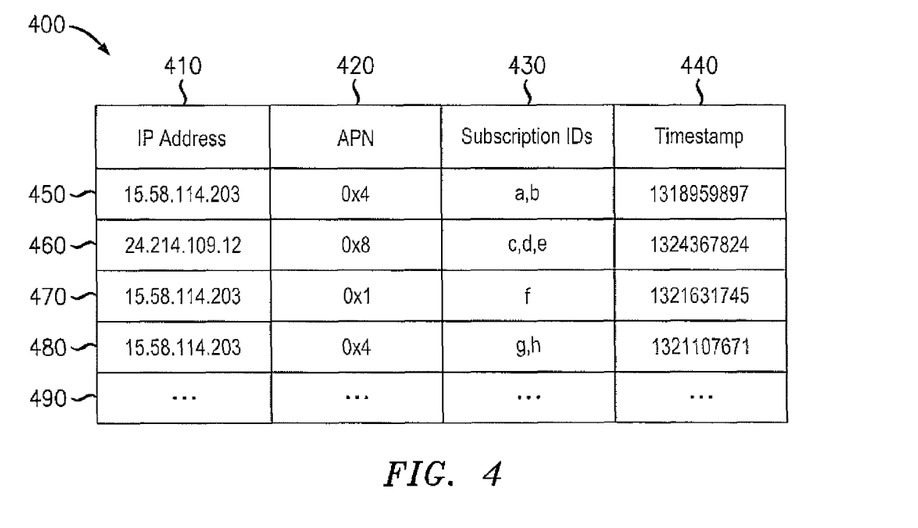
FIG. 4 illustrates an exemplary data arrangement for storing IP-CAN session records.

FIG. 4 illustrates an exemplary data arrangement 400 for storing IP-CAN session records. Data arrangement 400 may be, for example, a group of tables in a database stored in IP-CAN session storage 330 of DPA 300. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include multiple data fields such as, for example, IP address field 410, APN field 420, subscription identifiers field 430, and/or timestamp field 440. It will be apparent to those of skill in the art that data arrangement 400 may include additional fields (not shown) useful in performing the functions of a DPA. IP-address field 410 may store an IP address associated with an IP-CAN session. In various embodiments, this IP address may be an IPv4 and/or IPv6 address. APN field 420 may store an APN associated with an IP-CAN session. Together, IP address field 410 and APN address field 420 may store identification values useful in looking up an IP-CAN session record associated with an incoming message.

Subscription identifiers field 430 may store one or more subscription identifiers. Such subscription identifiers may be associated with a subscriber that is, in turn, associated with the IP-CAN session. Timestamp field 440 may store a timestamp or other indicator of when each record was created or last modified. In various embodiments wherein the order of records serves as such an indicator, timestamp field 440 may not be present.

As an example, IP-CAN session record 450 indicates that an IP-CAN session identified as having IP address 15.58.114.203 and APN 0x4 may be associated with a subscriber having subscription identifiers a and b. This record 450 may have been created at time 1318959897. The information conveyed by example IP-CAN session records 460, 470, 480 will be similarly apparent. Data arrangement 400 may include numerous additional IP-CAN session records 490.

It is worth noting that IP address field 410 and APN field 420 may not uniquely identify an IP-CAN session. As shown, IP-CAN session records 450, 470, 480 are all associated with the IP address 15.58.114.203. Further, IP-CAN session records 450, 480 are associated with the same IP address and APN pair.

Figure 5:
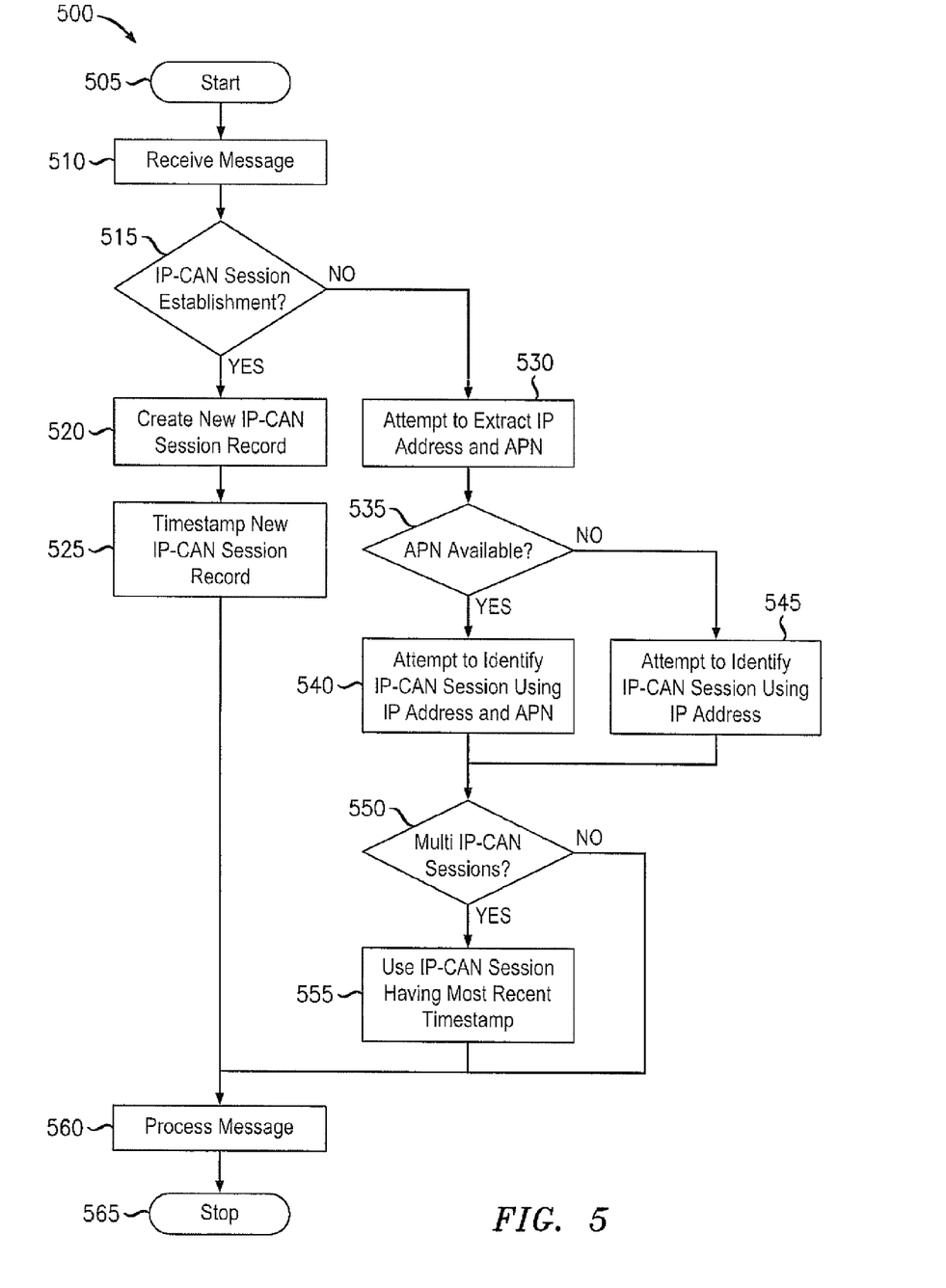
FIG. 5 illustrates an exemplary method for processing messages.

FIG. 5 illustrates an exemplary method 500 for processing messages. Method 500 may be performed by the components of DPA 300. Method 500 may begin in step 505 and proceed to step 510 where the DPA may receive a message from another node. Next, in step 515, the DPA may determine whether an IP-CAN session should be identified using a plurality of available entity records by determining whether the message is an IP-CAN establishment message. In various alternative embodiments, the DPA may determine that an IP-CAN session should be identified using a plurality of available entity records for every received message or for other subsets of message types. Appropriate modifications will be apparent to those of skill in the art.

If the message is an IP-CAN session establishment message, method 500 may proceed from step 515 to step 520 where the DPA may create a new IP-CAN session record based on the received message. Such new record may include information such as an IP address, APN, and/or one or more subscription identifiers. Then, in step 525, the DPA may timestamp the new record with the current time. Method 500 may then proceed to step 560.

If, on the other hand, the message is not an IP-CAN session establishment message, method 500 may proceed from step 515 to step 530. In step 530, the DPA may attempt to extract identification values, such as an IP address and APN. Next, in step 535, the DPA may determine whether the message carried an APN. If the message did carry an APN, the DPA may attempt to identify an associated IP-CAN session using the IP address and APN in step 540. If the message did not include an APN, the DPA may attempt to identify an associated IP-CAN session using only the IP address in step 545. After identifying one or more IP-CAN sessions in either step 540 or step 545, method 500 may proceed to step 550.

In step 550, the DPA may determine whether multiple IP-CAN session records match the extracted identification values. If one or fewer IP-CAN sessions were identified, method 500 may proceed to step 560. Otherwise, the DPA may determine, in step 555, which IP-CAN session record has the most recent timestamp. This IP-CAN session record may then be selected as corresponding to the received message. Method 500 may then proceed to step 560, where the DPA may continue processing the message. For example, the DPA may identify an appropriate PCRN blade based off of an associated IP-CAN session and/or subscriber and forward the message to that PCRN blade. Method 500 may then proceed to end in step 565.

Having described exemplary components and methods of operation of exemplary subscriber network 100 and PCRN 220, an example of the operation of exemplary subscriber network 100 and PCRN 220 will now be provided with reference to FIGS. 1-5. PCRN 220 may correspond to PCRN 136; DPA 300 may correspond to DPA 230; data arrangement 400 may indicate the contents of IP-CAN session storage 330; and method 500 may be performed by the components of DPA 230, 300.

The process may begin when DPA 230, 300 receives an AAR 160 from AF 150 in step 510. Then, in step 515, incoming message handler 310 may determine that AAR 160 is not an IP-CAN establishment message. Accordingly, incoming message handler 310 may forward the message to subscriber identification module 340. In step 530, subscriber identification module 340 may extract the IP 15.58.114.203 and APN 0x4. In step 540, subscriber identification module 340 may retrieve both IP-CAN session records 450, 480, as both records match the extracted identification values. Multiple record resolver 350 may, in step 555, determine that IP-CAN session record 480 should be used because this record includes the more recent time stamp. DPA 230, 300 may then proceed to identify subscription identifiers g and h as being associated with the message and, in turn, PCRN blade 1 240 as being associated with that subscriber in step 560. Finally, DPA 230, 300 may forward AAR 160 to PCRN blade 1 240 for further processing.

It should be noted that, if AAR 160 does not carry an APN value, subscriber identification module 340 may, in step 545, identify three IP-CAN session records 450, 470, 480 as all three records include the extracted IP address. Thereafter, multiple record resolver 350 may instead identify record 470 in step 555 as having the most recent timestamp. Accordingly, DPA 230, 300 may forward the message to a different PCRN blade 240, 242, 244 associated with subscription identifier f.

According to the foregoing, various embodiments enable a method of identifying an entity associated with a message when multiple entity records map to identifying information carried by the message. In particular, by including an indication of when each entity record was created or last modified, a DPA can select an entity most likely to be current and correct. Thereafter, the message may be processed with respect to that entity.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for processing a message, the method comprising:
   receiving a message at the network device;
   determining whether the network device should identify an entity associated with the message using a plurality of entity records, wherein each entity record of the plurality of entity records corresponds to an entity;
   if the network device should identify an entity associated with the message using the plurality of entity records:
   extracting at least one identification value from the message;
   identifying a set of entity records of the plurality of records as matching the at least one identification value;
   determining whether the set of entity records includes more than one entity record; and
   if the set of entity records includes more than one entity record:
   identifying a most current entity record of the set of entity records that has been most recently modified, and
   processing the message as being associated with the entity to which the most current entity record corresponds, including identifying a policy and charging rules node (PCRN) blade associated with the entity, wherein the entity includes at least one of an Internet Protocol Connectivity Access Network (IP-CAN) session and a subscriber.

2. The method of claim 1, wherein: the at least one identification value includes an IP address.

3. The method of claim 1, wherein the step of determining whether the network device should identify an entity associated with the message using the plurality of entity records comprises:
   determining whether the message is related to the establishment of a new entity; and
   if the message is not related to the establishment of a new entity, determining that the network device should identify an entity associated with the message using the plurality of entity records,
   the method further comprising, if the message is related to the establishment of a new entity, creating and storing a new entity record, wherein the entity record indicates when the entity record was created.

4. The method of claim 1, wherein the step of identifying a most current entity record of the set of entity records that has been most recently modified comprises identifying a most current entity record of the set of entity records that has been most recently created.

5. The method of claim 1, wherein the step of processing the message as being associated with the entity to which the most current entity record corresponds comprises: forwarding the message to the PCRN blade.

6. The method of claim 1, wherein the step of identifying a most current entity record of the set of entity records that has been most recently modified comprises comparing at least two timestamps to each other, the timestamps respectively associated with at least two entity records of the set of entity records.

7. The method of claim 1, wherein the message does not include an access point name (APN).

8. A network device for processing a message, the network device comprising:
   a network interface that receives a message;
   an entity storage memory that stores a plurality of entity records, wherein each entity record of the plurality of entity records corresponds to an entity;
   an incoming message processor configured to determine whether the network device should identify an entity associated with the message using a plurality of entity records;
   an entity identification processor configured to, if the network device should identify an entity associated with the message using the plurality of entity records:
   extract at least one identification value from the message,
   identify a set of entity records of the plurality of records as matching the at least one identification value, and
   determine whether the set of entity records includes more than one entity record; and
   a multiple record resolver processor configured to, if the set of entity records includes more than one entity record,
   identify a most current entity record of the set of entity records that has been most recently modified, and
   a message processor configured to process the message as being associated with the entity to which the most current entity record corresponds including identifying a policy and charging rules node (PCRN) blade associated with the entity, wherein the entity includes at least one of an Internet Protocol Connectivity Access Network (IP-CAN) session and a subscriber.

9. The network device of claim 8, wherein: the at least one identification value includes an IP address.

10. The network device of claim 8, wherein, in determining whether the network device should identify an entity associated with the message using the plurality of entity records, the incoming message processor is configured to:
   determine whether the message is related to the establishment of a new entity; and
   if the message is not related to the establishment of a new entity, determine that the network device should identify an entity associated with the message using the plurality of entity records, the network device further comprising a record creator configured to, if the message is related to the establishment of a new entity, creating and storing a new entity record in the entity storage, wherein the entity record indicates when the entity record was created.

11. The network device of claim 8, wherein, in identifying a most current entity record of the set of entity records that has been most recently modified, the multiple record resolver processor is configured to identify a most current entity record of the set of entity records that has been most recently created.

12. The network device of claim 8, wherein the message processor comprises a message router configured to forward the message to the PCRN blade.

13. The network device of claim 8, wherein, in identifying a most current entity record of the set of entity records that has been most recently modified, the multiple record resolver processor is configured to compare at least two timestamps to each other, the timestamps respectively associated with at least two entity records of the set of entity records.

14. A tangible and non-transitory machine-readable storage medium encoded with instructions for execution by a network device for processing a message, the tangible and non-transitory machine-readable storage medium comprising:
    instructions for receiving a message at the network device;
    instructions for determining whether the network device should identify an entity associated with the message using a plurality of entity records, wherein each entity record of the plurality of entity records corresponds to an entity;
    instructions for, if the network device should identify an entity associated with the message using the plurality of entity records:
    extracting at least one identification value from the message;
    identifying a set of entity records of the plurality of records as matching the at least one identification value;
    determining whether the set of entity records includes more than one entity record; and
    if the set of entity records includes more than one entity record:
    identifying a most current entity record of the set of entity records that has been most recently modified, and
    processing the message as being associated with the entity to which the most current entity record corresponds, including identifying a policy and charging rules node (PCRN) blade associated with the entity, wherein the entity includes at least one of an Internet Protocol Connectivity Access Network (IP-CAN) session and a subscriber.

15. The tangible and non-transitory machine-readable storage medium of claim 14, wherein: the at least one identification value includes an IP address.

16. The tangible and non-transitory machine-readable storage medium of claim 14, wherein the instructions for determining whether the network device should identify an entity associated with the message using the plurality of entity records comprise:
    instructions for determining whether the message is related to the establishment of a new entity; and
    instructions for, if the message is not related to the establishment of a new entity, determining that the network device should identify an entity associated with the message using the plurality of entity records,
    the tangible and non-transitory machine-readable storage medium further comprising instructions for, if the message is related to the establishment of a new entity, creating and storing a new entity record, wherein the entity record indicates when the entity record was created.

17. The tangible and non-transitory machine-readable storage medium of claim 14, wherein the instructions for identifying a most current entity record of the set of entity records that has been most recently modified comprise instructions for identifying a most current entity record of the set of entity records that has been most recently created.

18. The tangible and non-transitory machine-readable storage medium of claim 14, wherein the instructions for processing the message as being associated with the entity to which the most current entity record corresponds comprise:
    instructions for forwarding the message to the PCRN blade.

19. The tangible and non-transitory machine-readable storage medium of claim 14, wherein the instructions for identifying a most current entity record of the set of entity records that has been most recently modified comprise instructions for comparing at least two timestamps to each other, the timestamps respectively associated with at least two entity records of the set of entity records.

20. The tangible and non-transitory machine-readable storage medium of claim 14, wherein the message does not include an access point name (APN).

* * * * *